United States Patent
De Ren et al.

(10) Patent No.: US 10,940,613 B2
(45) Date of Patent: Mar. 9, 2021

(54) METHOD AND APPARATUS FOR CRYSTALLIZING AND INCREASING MOLECULAR WEIGHT OF POLYMER PARTICLES

(71) Applicant: UOP LLC, Des Plaines, IL (US)

(72) Inventors: Jan De Ren, Antwerp (BE); Stephan Dietmer Wilhelmi, Bergisch Gladbach (DE); Roel Julia Julien Bauters, Antwerp (BE)

(73) Assignee: UOP LLC, Des Plaines, IL (US)

(*) Notice: Subject to any disclaimer, the term of this patent is extended or adjusted under 35 U.S.C. 154(b) by 132 days.

(21) Appl. No.: 16/206,992

(22) Filed: Nov. 30, 2018

(65) Prior Publication Data
US 2019/0099919 A1    Apr. 4, 2019

Related U.S. Application Data

(63) Continuation of application No. PCT/US2017/038076, filed on Jun. 19, 2017.
(Continued)

(51) Int. Cl.
    *B29B 9/16*    (2006.01)
    *B29B 9/06*    (2006.01)
    (Continued)

(52) U.S. Cl.
    CPC .............. *B29B 9/16* (2013.01); *B29B 9/065* (2013.01); *C08G 63/183* (2013.01); *C08G 63/88* (2013.01);
    (Continued)

(58) Field of Classification Search
    None
    See application file for complete search history.

(56) References Cited

U.S. PATENT DOCUMENTS

| | | |
|---|---|---|
| 3,544,525 A | 12/1970 | Balint et al. |
| 5,547,652 A | 8/1996 | Ghisolfi et al. |
| (Continued) | | |

FOREIGN PATENT DOCUMENTS

| | | |
|---|---|---|
| CN | 1101300 A | 4/1995 |
| EP | 0822214 A2 | 2/1998 |
| (Continued) | | |

OTHER PUBLICATIONS

De Ren, Jan and Raymond Shih, Chapter 7.8, UOP SINCO Solid-State Polymerization Process, Honeywell UOP, pp. 7.99-7.114, 2019. Handbook of Petrochemicals Production Processes, Second Edition. Robert A. Meyers, Ph.D.
(Continued)

*Primary Examiner* — Mary Lynn F Theisen

(57) ABSTRACT

The present subject matter claims a process and apparatus for forming, crystallizing and increasing the molecular weight of polymer particles which does not require re-heating the polyethylene terephthalate (PET) pellets after they are cut and crystallized in the under water cutting (UWC) section. In the existing solid state polycondensation (SSP) technologies where an UWC is used, high crystallinity of the PET pellets can occur, by cooling and re-heating the PET pellets, which results in reduced removal efficiency of by-products, such as acetaldehyde (AA) and furthermore also a reduction of the reaction rates of molecular weight increasing reactions.

17 Claims, 1 Drawing Sheet

Related U.S. Application Data

(60) Provisional application No. 62/352,761, filed on Jun. 21, 2016.

(51) Int. Cl.
*C08G 63/183* (2006.01)
*B29K 67/00* (2006.01)
*C08G 63/88* (2006.01)
*F26B 5/08* (2006.01)
*C08J 5/00* (2006.01)
*C08G 63/80* (2006.01)

(52) U.S. Cl.
CPC .................... *C08J 5/00* (2013.01); *F26B 5/08* (2013.01); *B29B 2009/165* (2013.01); *B29K 2067/003* (2013.01); *C08G 63/80* (2013.01); *C08J 2367/02* (2013.01)

(56) References Cited

U.S. PATENT DOCUMENTS

| | | | |
|---|---|---|---|
| 5,714,571 A | 2/1998 | Al Ghatta et al. | |
| 5,817,747 A | 10/1998 | Giordano et al. | |
| 7,192,545 B2 | 3/2007 | Ekart et al. | |
| 7,521,522 B2 | 4/2009 | Otto et al. | |
| 7,868,125 B2 | 1/2011 | DeBruin et al. | |
| 7,993,557 B2 | 8/2011 | Hanimann et al. | |
| 8,039,581 B2 | 10/2011 | Ekart et al. | |
| 8,304,518 B2 | 11/2012 | Bruckmann | |
| 8,324,339 B2 | 12/2012 | Bruckmann | |
| 8,562,882 B2 | 10/2013 | Eusebio et al. | |
| 8,877,107 B2 | 11/2014 | Hanimann et al. | |
| 2005/0056961 A1* | 3/2005 | Bonner | B29B 9/06 264/143 |
| 2007/0205527 A1 | 9/2007 | McGehee | |
| 2007/0255036 A1* | 11/2007 | Christel | B29B 9/12 528/274 |
| 2007/0274789 A1 | 11/2007 | DeBruin et al. | |
| 2009/0072434 A1 | 3/2009 | Takita et al. | |
| 2009/0134537 A1 | 5/2009 | Eloo et al. | |
| 2009/0218052 A1* | 9/2009 | DeBruin | B29B 9/065 159/47.1 |
| 2011/0245452 A1* | 10/2011 | Ionita | F26B 17/00 528/308.1 |
| 2012/0035342 A1* | 2/2012 | Culbert | C08G 63/80 528/308.3 |
| 2012/0077951 A1* | 3/2012 | Hanimann | F26B 17/14 528/308.2 |
| 2014/0084504 A1 | 3/2014 | Christel et al. | |
| 2017/0260339 A1 | 9/2017 | Bormann et al. | |
| 2019/0099919 A1 | 4/2019 | Deren et al. | |

FOREIGN PATENT DOCUMENTS

| | | |
|---|---|---|
| RU | 2446944 C2 | 6/2011 |
| RU | 2446944 | 10/2012 |
| WO | 2008009144 A1 | 1/2008 |
| WO | 2008064768 A1 | 6/2008 |
| WO | 2008140522 A1 | 11/2008 |
| WO | WO 2008/140522 * | 11/2008 |
| WO | 2016010678 A1 | 1/2016 |

OTHER PUBLICATIONS

Mills, David, Excerpts from Pneumatic Conveying Design Guide, second edition, Elsevier Butterworth Heinemann, 2004, ISBN 0 7506 5471 6.

Mills, David, Excerpts from Pneumatic Conveying Design Guide, third edition, Elsevier Butterworth Heinemann, 2016, ISBN 978-0-08-1 00649-8.

Akkil, Raj P. et al., Design of Pneumatic Conveying System, IJIRST, vol. 3, Issue 11, Apr. 2017.

Metro, Stephen M. and James F. McGhee, Chapter 7.8, UOP SINCO Solid-State Polymerization Process for the Production of Pet Resin and Technical Fibers, Honeywell UOP, pp. 7.99-7.114, 2004. Handbook of Petrochemicals Production Processes, First Edition. Robert A. Meyers, Ph.D.

Thiele, Ulrich K., Polyester Bottle Resins, Production, Processing, Properties and Recycling, ISBN 978-3-98079497-4-9, Heidelberg, Germany, 2007.

International Search report for corresponding PCT application No. PCT/US2017/038076, dated Sep. 28, 2017.

Bhatia, A., Pneumatic Conveying Systems, Course No. M05-010, Continuing Education and Development, Inc., New York, NY, Jul. 2018, 57 pages.

Kapur, Aman, Simplified Pneumatic Conveying Design Guide, Class XII-A, Delhi Public School, New Delhi,—Acedemia.edu, after Summer, 2016.

Chemical Encyclopedia, Scientific Publishing House for the Grand Russian Encyclopedia, Moscow, 1992, vol. 3, pp. 582, 583 (Excerpt only).

Chemical Encyclopedia, Publishing House for the Soviet Encyclopedia, Moscow, 1990, vol. 2, pp. 527-531 (Excerpt only).

Chemical Encyclopedia, Scientific Publishing House for the Grand Russian Encyclopedia, Moscow, 1995, vol. 4, pp. 47-48. (Excerpt only).

The Grand Soviet Encyclopedia, second edition, ed., B.A. Vvedenskiy, State Research Institute for the Grand Soviet Encyclopedia, sent for printing Apr. 21, 1956, vol. 41, pp. 348-349. (Excerpt only).

Pearl Engineering for bottle products, Technical Certificate PEPLPET B-103C PET, found on internet on Nov. 26, 2019 URL: [http://www.matweb.com/search/DataSheet.aspx?MatGUID=45144cab27fa4e48bdd50 8d9f8fbbd08].

Scheirs, John et al., Modern Polyesters: Chemistry and Technology of Polyesters and Copolyesters, John Wiley and Sons, England, 2003, pp. 98, 159.

Aslanova, M.S. et al., Chemical Fibers, ed., Moscow, 1976, p. 114, table 5.2.

* cited by examiner

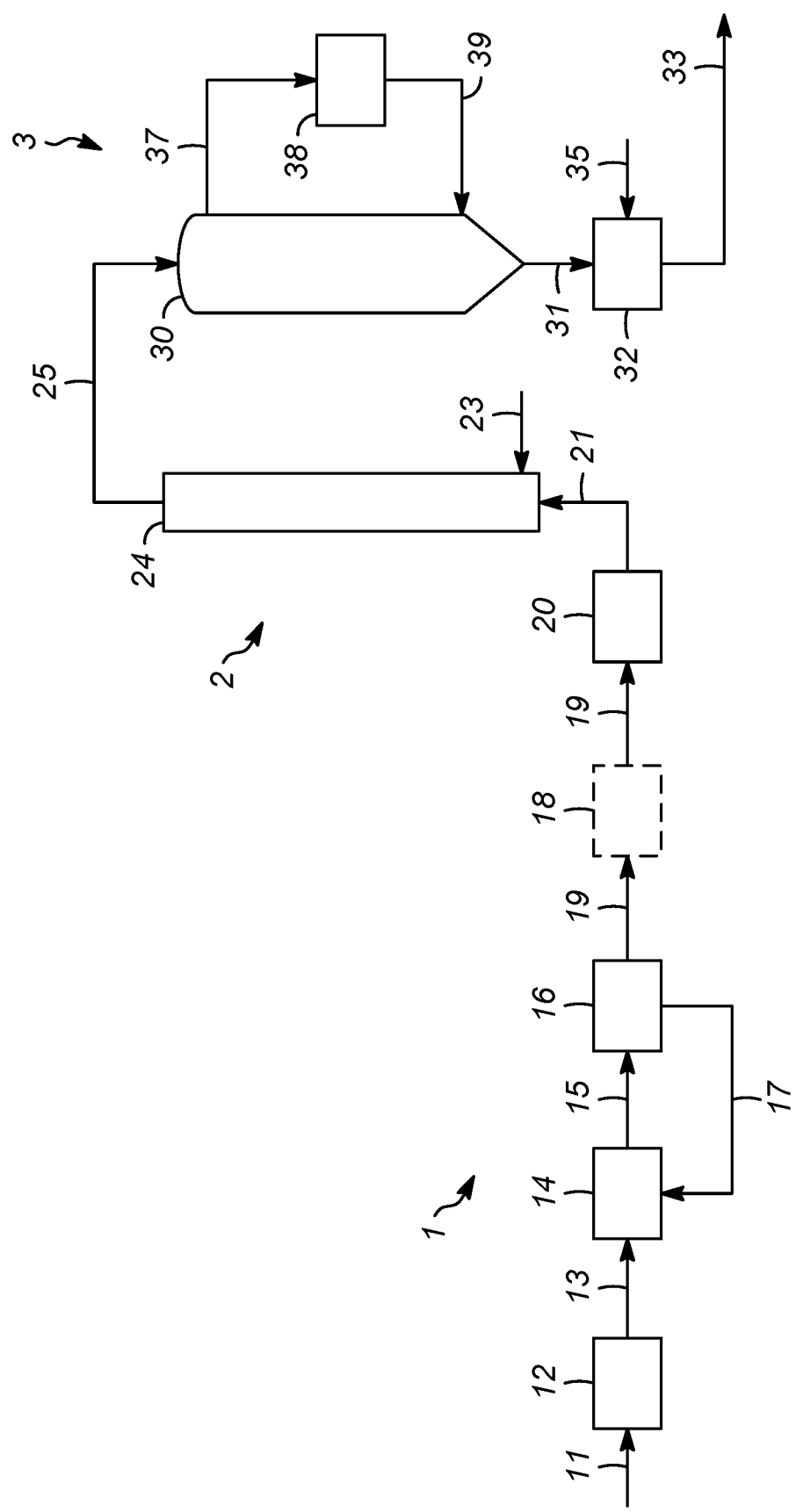

METHOD AND APPARATUS FOR CRYSTALLIZING AND INCREASING MOLECULAR WEIGHT OF POLYMER PARTICLES

CROSS-REFERENCE TO RELATED APPLICATIONS

This application is a Continuation of copending International Application No. PCT/US2017/038076 filed Jun. 19, 2017, which application claims priority from U.S. Provisional Application No. 62/352,761 filed Jun. 21, 2016, the contents of which cited applications are hereby incorporated by reference in their entirety.

BACKGROUND

The present invention relates to forming and crystallizing low molecular weight polymer particles. More particularly, this invention relates to a method and apparatus for extruding, cutting and crystallizing polymer particles with a molecular weight increasing process afterwards.

Polymer resins are molded into a variety of useful products. Useful polymer resins include aromatic polyesters of which polyethylene terephthalate (PET), polytrimethylene terephthalate (PTT), polybutylene terephthalate (PBT), polytrimethylene naphthalate (PTN), polycyclohexyl terephthalate (PCT) and polyethylene naphthalate (PEN) are examples. Polyester resins, particularly PET, copolymers of terephthalic acid with lower proportions of isophthalic acid and PBT are used in the production of beverage containers, films, fibers, packages and tire cord.

Polyester resin is conventionally produced in a melt phase polymerization (MPP) process with relatively low molecular weight inadequate for commercial uses. The molecular weight of MPP product must be upgraded. Consequently, the MPP product is formed into particles and subjected to solid state polycondensation (SSP) to increase its molecular weight by maintaining the solid polymer particles at temperatures between the glass transition and the melting point temperatures while removing the reaction products under an inert gas sweep or vacuum.

Molten polyester resin from the MPP is typically extruded under pressure and cut into small particles. U.S. Pat. No. 4,436,782 discloses a machine for forming molten pellets of PET and quenching the pellets in water. UK 1,143,182 teaches a die-face polymer cutter with the die face submerged in water to immediately quench pellets upon forming. WO 00/23497 discloses extruding the molten polymer into strands, quenching the strands in cooling liquid and cutting the strands into polymer particles.

According to U.S. Pat. No. 4,064,112, the tendency of the particles to agglomerate due to stickiness during solid state polycondensation (SSP) can be reduced and even eliminated if the solid state polymerization is preceded by a crystallization step which comprises thermal treatment. A process described in U.S. Pat. No. 5,540,868 forms low molecular weight polyester particles with a degree of crystallinity greater than about 15% suitable for use as an SSP feedstock. U.S. Pat. No. 5,290,913 discloses crystallizing PET particles in an agitated liquid bath and heating to crystallization temperature. U.S. Pat. No. 5,532,335 and WO 00/23497 teach crystallizing polyesters in liquid over 100° C. Processes disclosed in U.S. Pat. No. 6,740,733 B2, U.S. Pat. No. 6,297,315 B1 and U.S. Pat. No. 6,461,575 B1 separate relatively cool water used in pelletizing from PTT pellets and crystallize the pellets in relatively warm water at no more than 100° C. WO 00/23497 discloses cooling PET during or after forming and then crystallizing PET pellets at above 100° C.

The process in WO 2004/033174 entails granulating polymer in a liquid bath or immediately conducting granulate into a liquid bath with a temperature above 100° C. Following crystallization, the granulate-liquid mixture is cooled down to around 60° C., admixed with a cooler liquid, and depressurized after which the granulate is separated from liquid.

U.S. Pat. No. 6,749,821 shows that in a typical SSP process, polymer particles are delivered to an SSP reactor system through a hopper to a heated, fluidized bed pre-crystallizer operating to achieve a degree of crystallinity. The polymer particles are then fed into a first crystallizer and then optionally into a second crystallizer. The crystallizers heat the polymer particles under mechanical agitation to bring them to the desired reaction temperature and degree of crystallinity suitable for the ensuing SSP reactor. Polyester polymers undergo exothermic heat of crystallization if not crystallized to a sufficient degree. The continuance of the crystallization process in the SSP reactor leads to problems of heat release and agglomerization or sintering of the particles, causing maldistribution of gases and solids flow interruptions. The inlet of the tall SSP reactor is high above the ground, so the particles will have to be lifted to the inlet to enter the SSP process. In industrial practice, this is usually by slow motion pneumatic conveying.

In the existing SSP technologies where an under water cutter (UWC) is used, the following problems are frequently observed: high crystallinity of the PET pellets which results in reduced removal efficiency of acetaldehyde (AA) and furthermore also a reduction of the reaction rates of molecular weight increasing reactions. The aforementioned problems are assumed to be caused by re-heating of the PET pellets, thereby creating an extra crystalline layer at the surface of the resin which blocks the removal of AA and reduces the reaction rates by reducing the diffusion of byproducts such as ethylene glycol (EG), water ($H_2O$) and AA. Next to the crystalline layer formation, the overall crystallinity of the PET pellet is significantly increased by re-heating. Therefore, there is a need to create a SSP process that does not require re-heating the PET pellets after they are cut and crystallized in the UWC section.

SUMMARY

The present invention is a process and apparatus for a SSP process that does not require re-heating the PET pellets after they are cut and crystallized in the UWC section.

A first embodiment of the invention is a process for making PET particles comprising a PET melt having a temperature of about 230° C. to about 310° C.; cutting the molten PET particles into pellets while quenching with a cooling liquid; drying the solid PET particles; passing the solid PET particles to a crystallization bin wherein crystallization of the particles takes place, resulting in a temperature increase and crystallization of the PET particles which forms from core to surface; and contacting the solid PET particles with hot inert gas.

BRIEF DESCRIPTION OF THE DRAWING

The FIGURE is a schematic view of the present invention.

DETAILED DESCRIPTION

The present invention can be used for forming molten polymer into particles if the polymer must be cooled after it is formed into a desired shape. The polymer of the present invention is preferably a crystallizable thermoplastic polymer. Polyester polymer is particularly suitable for the present invention and PET polymer is preferred. Copolymers of PET and other polyesters are also suitable.

Description of the present invention will be made with respect to the FIGURE. The present invention comprises a particulation and quench system 1 serviced by cooling liquid, a crystallization and transportation section 2 serviced by an inert gas or air and an SSP reactor system 3 serviced by a hot inert gas. The particulation and quench system 1 comprises a molding device 12 that receives polymer resin from a line 11. The resin in the line 11 is either already molten or the molding device 12 heats it above the melting temperature to put the polymer into the molten state. The molten polymer is sent through line 13 to cooling chamber 14. Any of several ways can be used to form the molten polymer into particles. However, it is important that the polymer particles spend relatively little time in the quench liquid and the time between particles forming and entry into the warming liquid be minimized. However, the die-face polymer cutter of GB 1,143,182 is preferred for minimizing cooling before warming.

In an embodiment, the molten polymer resin enters a pressurized chamber and is extruded though an orifice plate whose face is swept by a rotating cutter. The extruded polymer enters a cooling chamber 14 through the orifices and is cut into polymer particles while quenched under pressurized cooling liquid delivered through an inlet into the chamber 14 by a line 17. In the example shown in the FIGURE the cooling liquid entering in line 17 is water. The cooling liquid solidifies the exterior of the polymer particles while preferably leaving the interior molten. The polymer particles in the cooling liquid will be transported from the cooling chamber 14 directly to a cooling liquid removal device 16. The cooling liquid removal device may include an elbow-shaped profile screen, a dewatering cone, a centrifuge or a hydrocyclone which quickly removes polymer particles from a substantial amount of the cooling liquid. The centrifuge of the cooling liquid removal device revolves at high speed to separate the cooling liquid removed from the top thereof in a line and the polymer solids removed in a line. Higher efficiency of the separation in the cooling liquid removal device will result in higher conservation of heat in the polymer particles. Centrifuges may achieve 90% efficiency in separating liquid from solids whereas static devices may only be about 60% efficient.

The objective of the cooling liquid in the line 15 will be to facilitate forming of the polymer into solid particles which requires a lower temperature to solidify the particle exterior while not reducing the average bulk temperature of the polymer below the desired temperature for molecular weight increasing reactions for the polymer. Hence, the combination of the cooling liquid temperature and the residence time of the polymer particles in the cooling liquid between the cooling chamber 14 through the cooling liquid removal device 16 should operate such that the average bulk temperature of the polymer will not go below this temperature. The temperature of the molten polymer before quenching will be above about 260° C. and preferably at least 270° C. The temperature of the cooling liquid will typically be no more than 100° C. for PET. However, higher temperatures may be used at suitably higher pressures to avoid liquid boiling. Cooling liquid may be selected from any compatible material, preferably those which have compatibility with the polyester resin and introduce minimal degradation.

The cooling liquid is preferably water and may include additives such as ethylene glycol to raise the boiling point. However, other liquids such as related glycols may be added. The relationship of the temperature of a polymer to the amount of cooling to which it is subjected by the cooling liquid is shown in Formula (2):

$$(T_{molten}-T_q)*(mC_{presin})=Q_{cooling} \qquad (2)$$

wherein, $T_q$ is the average bulk temperature of the resin particle after it is removed from the cooling liquid, m is the mass flow rate of the resin, $C_{presin}$ is the average heat capacity of resin, $Q_{cooling}$ is the heat lost during the particulation and quenching step and $T_{molten}$ is the temperature of molten polymer leaving the melt phase process in the line 11 and entering the molding device 12. In an embodiment, it is desirable to ensure that $T_q$ remains above the temperature at which molecular weight increasing reactions take place at a considerable rate, which is 190° C. for PET. In an embodiment, the molding device 12, cooling chamber 14, cooling liquid removal device 16 and the screen catcher 18 (which is optional, thereby being indicated in dashed lines on the FIGURE) of the particulation and quench section are integrally united to each other to minimize polymer cooling time and more easily maintain pressure. It is also contemplated the screen catcher may be omitted in which case the liquid removal device 16 and the crystallization bin 20 would be integrally united. Conduits connecting the units are also contemplated, but relatively long conduits will increase the degree of cooling which is undesirable.

The crystallization section 2 begins with a conduit or line 19 that delivers the particles to a crystallization bin 20 in which sufficient residence time may be given to allow the polymer particles to crystallize to the desired level. The desired level of crystallinity for the polymer with respect to further solid stating is defined as that minimum percent crystallinity which is high enough so that further exothermic heat release in the solid stating reactor is not likely. The exact level may differ between resins. The percent crystallinity is typically estimated from the density of the granule by its buoyancy in a gradient density column according to ASTM D1505-98 "Standard Test Method for the Density of Plastics by Density-Gradient Technique", assuming 0% crystallinity (completely amorphous resin) to have a density of 1.332 g/cc and 100% crystallinity to have density of 1.455 g/cc. A typical value for resin crystallinity suitable for PET copolymer in a downstream SSP is 30% to 50%. A line 21 delivers the polymer particles to the inlet of a riser 24 which transports the polymer particles up to an elevation near the top of an SSP reactor system while giving the polymer particles sufficient time to crystallize. The transport riser 24 operates in plug-flow, using a gas supplied via line 23, and, in an embodiment, with a minimum of a one-minute residence time. Shorter residence times are contemplated. The gas from line 23 is preferably hot and inert, such as nitrogen, to reduce cooling and undesirable side-reactions. Other gasses are contemplated. A line 25 delivers the effluent from an outlet of the riser 24 directly to the SSP reactor. At this point the polymer particles have achieved a crystallization roughly between 30 and 50% based on density measurement.

The crystalline polymer particles are delivered to the SSP reactor 30 in system 3. The polymer particles entering the SSP reactor system 3 are at a temperature of about 190° C. to 220° C. and preferably about 210° C. which is the preferred inlet temperature of polymer particles entering an SSP reactor 30. However, other temperatures may be suitable. The SSP reactor 30 is preferably a downwardly flowing SSP reactor, but a batch SSP reactor may be suitable. Polymer particles move downwardly in the SSP reactor 30 counter-currently to the flow of hot inert gas, which is preferably nitrogen, to upgrade the molecular weight to the degree of polymerization of the polymer particles. Inert gas may enter through a line 39 while upgraded polymer particles exit the SSP reactor 30 through a line 31. A lock hopper (not shown) may be used to enable removal of the particles without depressurizing the system. A cooling device 32 may be applied to cool the particles, using a cooling medium supplied by a line 35. The particles exit this device through an effluent line 33. However, in some conditions, the flow scheme of the FIGURE may operate to obviate the need for cooling device 32 and deliver the upgraded polymer particles from the SSP reactor 30 directly to effluent line 33. A line 37 brings the inert gas to a gas purification and recycle system 38, preferably including a nitrogen purification unit (NPU) as described in patent EP 0660746B2, which has an effluent in line 39 that is brought back to the SSP reactor 30. In some conditions, in which the gas used in the transporting riser 24 is inert, the inert gas can be supplied from the same purification system 38 to the transporting riser 24 via line 23 (not shown).

The flow scheme of the present invention operates to minimize or eliminate the heating of the polymer particles, thus minimizing the added crystallization layer that is formed when the polymer particles are re-heated. The present invention is advantageous because by obviating the extra crystalline layer, diffusion of by-products and reduced molecular weight increasing reactions are strongly mitigated.

EXAMPLES

The following examples listed in table 1 are intended to further illustrate the subject embodiments. These illustrations of different embodiments are not meant to limit the claims to the particular details of these examples.

inhibited as compared to the UWC SSP concept where reheating results in a higher allowable AA content in the SSP feed. Furthermore, also by avoiding the formation of the crystalline layer, the final crystallinity of the PET pellets will be significantly lower than compared to other SSP concepts, resulting in energy savings for preform producers. Lower crystallinity results in heating energy savings for producing preforms, since the lower the crystallinity requires less heat to deform the structure, due to less rigid initial morphology.

Resin clogging behavior is further reduced by having a higher initial driving force (higher PET pellet resin temperature of about 30° to about 60° C., compared to the existing under water cutting process) which results in more homogenous crystallization behavior and consequently mitigates downstream exothermic re-crystallization, which could result in clogging. A reactivity similar to the conventional gravity flow SSP processing is expected, since as already mentioned, the crystalline layer formation in avoided in the claimed SSP process. Also, high temperature under water cutting and avoidance of reheating results in superior, homogenous properties of the PET pellets compared to other SSP concepts. The high temperature cutting is a driving force that ensures homogeneous crystallization, and the obviation of reheating results in a single crystallization regime (from inside to outside).

Further, as shown in Table 1, by eliminating the requirement for reheating, two pieces of standard process preconditioning equipment can be eliminated compared to the conventional gravity flow SSP processing. For example, it may be possible to eliminate equipment which was traditionally used to pre-condition the PET pellets to allow proper polycondensation in the countercurrent SSP reactor. The elimination of this equipment results in more than 50% electrical consumption savings and almost 90% heat energy savings both compared to the original SSP gravity flow process. Compared to the UWC indirect SSP process, electrical energy savings are more than 40%, and the savings in

TABLE 1

| PET Resin<br>Product Properties | Conventional<br>SSP (existing) | UWC Indirect<br>SSP (existing) | UWC Direct SSP<br>(patent application |
|---|---|---|---|
| IV SSP in // out | 0.55-0.64 dL/g//<br>0.78-0.86 dL/g | 0.60-0.64 dL/g//<br>0.78-0.86 dL/g | 0.55-0.75 dL/g//<br>0.78-0.86 dL/g |
| AA in CP melt | Max. 100 ppm | Max. 50-70 ppm | Max. 70 ppm |
| AA SSP RX in | Max. 20 ppm | Max. 15 ppm | Max. 20 ppm |
| AA SSP RX out | <1 ppm | <1 ppm | <1 ppm |
| Crystallinity SSP in (after cutting) | 0-10% | 38-42% | 38-42% |
| Crystallinity SSP RX in | 40-45% | 42-45% | 38-42% |
| Crystallinity SSP RX out | 50-55% | 55-65% | 38-60% |
| Resin Clogging behavior during SSP | Limitation 210-215° C. | Limitation 210-215° C. | Limitation 225° C. |
| Reactivity @ 205° C. | ~0.0145 dL/g*h | ~0.0120-0.0140 dL/g*h<br>(due to layer creation) | ~0.0145 dL/g*h<br>(no layer creation) |
| Crystalline layer appearing? | No | Yes | No |
| Heat for polycondensation reactions | From Outside | From Inside & Outside | From Inside |
| Electrical Energy Consumption<br>(600 MTD) | 60 kWh/ton | 42 kWh/ton | 29 kWh/ton<br>(fluidized bed cooler)<br>13 kwh/ton<br>(static cooler) |
| Heat Energy Consumption<br>(600 MTD) | 63 kWh/ton | 20 kWh/ton | 8 kWh/ton |

Table 1 demonstrates the benefits of the process claimed in this invention. The SSP process claimed results in significant quality and flexible improvement in SSP operation, which also results in significant OPEX savings as demonstrated in Table 1. By avoiding the polyester resin reheating steps, the formation of a crystalline layer at the outside of the PET pellet is prevented. Therefore, the AA diffusion is not heat energy are more than 50%. In addition to the OPEX being advantageous, elimination of the two pieces of preconditioning equipment also results in increased flexibility, by allowing direct connection to high IV CP concepts. As illustrated in Table 1, a SSP feed ranging from 0.55 dL/g to 0.75 dL/g can be processed, whereas in previous concepts, this range was not feasible.

It should be noted that various changes and modifications to the presently preferred embodiments described herein will be apparent to those skilled in the art. Such changes and modifications may be made without departing from the spirit and scope of the present subject matter and without diminishing its attendant advantages.

SPECIFIC EMBODIMENTS

While the following is described in conjunction with specific embodiments, it will be understood that this description is intended to illustrate and not limit the scope of the preceding description and the appended claims.

A first embodiment of the invention is a process for making PET particles comprising a PET melt having a temperature of about 230° C. to about 310° C.; cutting the molten PET particles into pellets while quenching with a cooling liquid resulting in sold PET particles; drying the solid PET particles; passing the solid PET particles to a crystallization bin wherein crystallization of the particles takes place, resulting in a temperature increase; and contacting the solid PET particles with hot inert gas or air. An embodiment of the invention is one, any or all of prior embodiments in this paragraph up through the first embodiment in this paragraph, further comprising transporting the solid PET particles upwardly to the top of a SSP reactor with hot inert gas. An embodiment of the invention is one, any or all of prior embodiments in this paragraph up through the first embodiment in this paragraph, wherein the cooling liquid has a temperature from about 60° C. to about 140° C. An embodiment of the invention is one, any or all of prior embodiments in this paragraph up through the first embodiment in this paragraph, wherein the cooling liquid has a contact time of about 01 seconds to about 5 seconds to obtain solid PET particles. An embodiment of the invention is one, any or all of prior embodiments in this paragraph up through the first embodiment in this paragraph, wherein drying the solid PET particles comprises a physical separation using a centrifugal dryer. An embodiment of the invention is one, any or all of prior embodiments in this paragraph up through the first embodiment in this paragraph, wherein the solid PET particles include a temperature of about 190° C. to about 215° C. An embodiment of the invention is one, any or all of prior embodiments in this paragraph up through the first embodiment in this paragraph, wherein a temperature increase ranging from about 5° C. to about 10° C. due to the exothermic crystallization takes place in the crystallization bin. An embodiment of the invention is one, any or all of prior embodiments in this paragraph up through the first embodiment in this paragraph, wherein passing the solid PET particles to a crystallization bin includes an outlet temperature of about 190° C. to about 225° C. An embodiment of the invention is one, any or all of prior embodiments in this paragraph up through the first embodiment in this paragraph, wherein crystallization is caused by the residual heat from the PET melt. An embodiment of the invention is one, any or all of prior embodiments in this paragraph up through the first embodiment in this paragraph, wherein the PET particles include a crystallinity of about 30% to about 50%. An embodiment of the invention is one, any or all of prior embodiments in this paragraph up through the first embodiment in this paragraph, wherein PET particle crystallization forms from core to surface.

A second embodiment of the invention is an apparatus for producing solid crystallized polymer particles comprising a molding device for forming molten polymer in a quenching chamber with a cooling liquid inlet for quenching the molten polymer in a cooling liquid to obtain solid polymer; a cooling liquid removal device in fluid communication with the quenching chamber for removing a substantial amount of the cooling liquid from the solid polymer; a screen catcher; a crystallization bin; a pneumatic inert gas conveying system; and an SSP reactor vessel with a countercurrent flow of inert gas. An embodiment of the invention is one, any or all of prior embodiments in this paragraph up through the second embodiment in this paragraph, further comprising a cooling device at the outlet of the SSP reactor. An embodiment of the invention is one, any or all of prior embodiments in this paragraph up through the second embodiment in this paragraph, further comprising a nitrogen purification unit (NPU) wherein the inert gas of the SSP reactor and/or pneumatic conveying system is purified and recycled in two steps a reaction step comprising one or more heating device(s), heating the gas with a warming liquid or by means of electricity; a catalytic reactor with operating temperature ranging in which entrained contaminants are converted (to carbon dioxide and water); a drying step to remove the produced water, comprising; a cooling device, cooling the gas stream with a cooling liquid; a molecular sieve type of dryer. An embodiment of the invention is one, any or all of prior embodiments in this paragraph up through the second embodiment in this paragraph, further comprising a repressurization step, comprising one or more filtering device(s) to remove entrained dust and one or more blower(s) to recycle the gas. An embodiment of the invention is one, any or all of prior embodiments in this paragraph up through the second embodiment in this paragraph, further comprising one or more gas-gas heat exchanging device(s) to increase heat integration. An embodiment of the invention is one, any or all of prior embodiments in this paragraph up through the second embodiment in this paragraph, further comprising A third embodiment of the invention is an apparatus to regenerate the molecular sieves with a flow of inert gas, comprising of a parallel dryer vessel, with possibility to switch between the two dryer vessels; a cooling device, cooling the inert gas with a cooling liquid with integrated and/or separate water removal; a blower to circulate the gas; and a heating device, heating the inert gas with a warming liquid or by means of electricity to be able to remove water adsorbed on the molecular sieves.

In the foregoing, all temperatures are set forth in degrees Celsius and, all parts and percentages are by weight, unless otherwise indicated.

The invention claimed is:

1. A process for making PET particles comprising:
   extruding a PET melt having a temperature of about 230° C. to about 310° C. to form a molten PET strand;
   cutting the molten PET strand into pellets while quenching with a cooling liquid resulting in solid PET particles;
   drying the solid PET particles;
   passing the solid PET particles to a crystallization bin without reheating the solid PET particles, and wherein crystallization of the particles takes place in the crystallization bin, resulting in a temperature increase and crystallization of the solid PET particles which forms from core to surface in the crystallization bin;
   contacting the solid PET particles with hot inert gas or air; and
   transporting the solid PET particles in a transport riser to the top of a SSP reactor with the hot inert gas or air.

2. The process for making PET particles as in claim 1, wherein the cooling liquid has a temperature from about 60° C. to about 140° C.

3. The process for making PET particles as in claim 1, wherein the cooling liquid has a contact time of about 0.01 seconds to about 5 seconds to obtain solid PET particles.

4. The process for making PET particles as in claim 1, wherein drying the solid PET particles comprises a physical separation using a centrifugal dryer.

5. The process for making PET particles as in claim 1, wherein the solid PET particles entering the crystallization bin have a temperature of about 190° C. to about 215° C.

6. The process for making PET particles as in claim 1, wherein a temperature increase ranging from about 5° C. to about 10° C. due to the exothermic crystallization takes place in the crystallization bin.

7. The process for making PET particles as in claim 1, wherein an outlet temperature of the crystallization bin is about 195° C. to about 225° C.

8. The process for making PET particles as in claim 1, wherein crystallization is caused by the residual heat from the PET melt.

9. The process for making PET particles as in claim 1, wherein the PET particles include a crystallinity of about 30% to about 50%.

10. The process for making PET particles as in claim 1, wherein PET particle crystallization forms from core to surface.

11. An apparatus for producing solid crystallized polymer particles comprising:
   a molding device for forming molten polymer in a quenching chamber with a cooling liquid inlet for quenching said molten polymer in a cooling liquid to obtain solid polymer;
   a cooling liquid removal device in fluid communication with said quenching chamber for removing a substantial amount of said cooling liquid from said solid polymer;
   a screen catcher connected to the cooling liquid removal device;
   a crystallization bin having an inlet connected to the screen catcher;
   a pneumatic inert gas conveying system having an inlet connected to an outlet of the crystallization bin; and
   an SSP reactor vessel with a countercurrent flow of inert gas having an inlet connected to an outlet of the pneumatic inert gas conveying system.

12. The apparatus of claim 11, further comprising a cooling device connected to an outlet of the SSP reactor vessel.

13. The apparatus of claim 11, further comprising a nitrogen purification unit (NPU) connected to the SSP reactor and/or the pneumatic conveying system wherein the inert gas of the SSP reactor and/or pneumatic conveying system is purified and recycled:
   a reaction section comprising:
      one or more heating device(s), heating the gas with a warming liquid or by means of electricity;
      a catalytic reactor connected to the one or more heating device(s) with operating temperature ranging in which entrained contaminants are converted;
   a drying section to remove the produced water connected to the reaction section, comprising;
      a cooling device, cooling the gas stream with a cooling liquid;
      a molecular sieve type of dryer connected to the cooling device.

14. The apparatus of claim 13, further comprising one or more filtering device(s) to remove entrained dust and one or more blower(s) to recycle the gas connected to the drying section.

15. The apparatus of claim 13, further comprising one or more gas-gas heat exchanging device(s) to increase heat integration.

16. The apparatus of claim 13, further comprising an apparatus connected to the molecular sieve type of dryer to regenerate the molecular sieves with a flow of inert gas, comprising of:
   a parallel dryer vessel, with possibility to switch between the molecular sieve type of dryer and the parallel dryer vessel;
   a cooling device, cooling the inert gas with a cooling liquid with integrated and/or separate water removal;
   a blower to circulate the gas; and
   a heating device, heating the inert gas with a warming liquid or by means of electricity to be able to remove water adsorbed on the molecular sieves.

17. A process for making PET particles comprising:
   extruding a PET melt having a temperature of about 230° C. to about 310° C. to form a molten PET strand;
   cutting the molten PET strand into pellets while quenching with a cooling liquid resulting in solid PET particles, wherein the cooling liquid has a temperature from about 60° C. to about 140° C., and wherein the cooling liquid has a contact time of about 0.01 seconds to about 5 seconds to obtain the solid PET particles;
   drying the solid PET particles using a centrifugal dryer;
   passing the solid PET particles having a temperature of about 190° C. to about 215° C. to a crystallization bin wherein crystallization of the particles takes place caused by the residual heat from the PET melt, resulting in a temperature increase and crystallization of the solid PET particles which forms from core to surface in the crystallization bin, wherein the temperature increase ranges from about 5° C. to about 10° C. due to the exothermic crystallization, and wherein an outlet temperature of the crystallization bin is about 195° C. to about 225° C.;
   contacting the solid PET particles with hot inert gas or air; and
   transporting the solid PET particles to the top of a SSP reactor with the hot inert gas, wherein the solid PET particles exiting the SSP reactor have a crystallinity of about 30% to about 50%, and wherein PET particle crystallization forms from core to surface.

\* \* \* \* \*